UNITED STATES PATENT OFFICE.

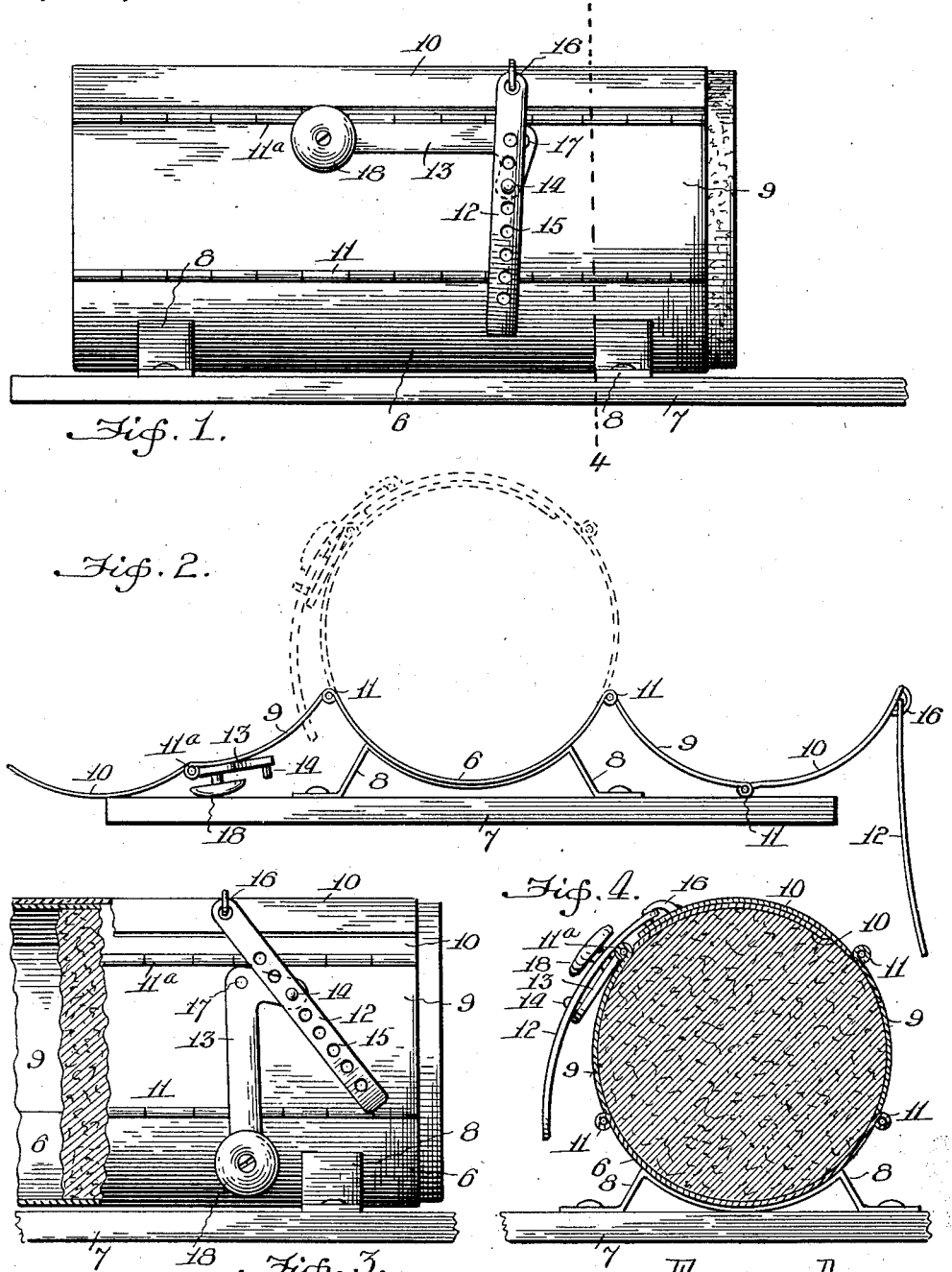

FREDERICK BRIGGS, OF WASHINGTON, DISTRICT OF COLUMBIA.

DEVICE FOR HOLDING MEAT.

1,044,438.

Specification of Letters Patent.   Patented Nov. 12, 1912.

Application filed June 17, 1912.   Serial No. 704,197.

*To all whom it may concern:*

Be it known that I, FREDERICK BRIGGS, a citizen of the United States, residing at Washington, in the District of Columbia, have invented a Device for Holding Meat, of which the following is a specification.

The principal object of my present invention is to provide a device for the convenience of a retail merchant in dispensing meats, especially cooked hams, whereby the meat is inclosed in a receptacle for protection and the receptacle employed also for the purpose of firmly gripping or holding the meat or ham during the operation of cutting slices from the same, so that the merchant is not required to place his hands upon the meat.

In the present instance my invention consists of a receptacle or cylinder composed of sections which may be opened or separated to receive the meat, in connection with means for clamping said sections upon the meat when closed thereon.

My invention further consists in the particular construction of the receptacle or cylinder, and in the particular construction of the means employed for clamping the same upon the meat, all as hereinafter fully described and specifically set forth in the appended claims.

In the accompanying drawings: Figure 1 is a side elevation of a device for holding meat, constructed in accordance with my invention. Fig. 2 is an end view, with the parts or sections of the receptacle or cylinder opened to receive the meat. Fig. 3 is a detail side elevation, to show the operation of the clamping means. Fig. 4 is a transverse sectional view, on the line 4—4 of Fig. 1.

Like numerals of reference indicate like parts in all the figures of the drawings.

In carrying out my invention I employ an open-end receptacle of such construction that the meat in bulk may be readily placed therein, and for this purpose said receptacle is preferably made up of several longitudinal sections hingedly connected so that they may be opened out to receive the meat and when folded thereon will easily conform to the size of the roll of meat. In the present instance the receptacle is composed of five longitudinal sections, the central section 6 being secured to a base or board 7 by means of feet 8, and the other sections 9, 9, and 10, 10, hinged together and to the opposite side edges of said center section. The ears of the hinges, 11, are disposed at the outer side of the sections so as to provide a smooth wall for the inner side of the receptacle, one of said hinges, as 11ª, also forming a stop for the operating-lever of the clamping device hereinafter described.

By forming the receptacle of longitudinal sections as herein shown and described the opposite sections 9 and 10 may be swung back, as shown in Fig. 2, so that the roll of meat may be placed in the trough-like section 6, and then said sections 9—10 folded upon the meat to inclose and protect the same—the end sections 10, 10, overlapping each other to a more or less extent, according to the size of the roll. Any suitable means may be employed for locking or clamping the folding sections upon the meat, so that it may be firmly held within the receptacle, especially during the operation of cutting slices from the projecting end of the meat.

In the present instance the clamping device consists of a plate 12 pivoted to the overlapping section 10, and a cam-lever 13 pivoted to one of the opposite sections, said cam-lever having a pin 14, which engages any one of a series of perforations or holes 15 in the aforesaid pivoted plate. The cam-lever is preferably pivoted to the section 9 immediately below the hinge 11ª, so that the latter will form a stop for the lever when the latter is thrown to a substantially horizontal position, as shown in Fig. 1, and it will be noted that when said lever is thrown to this position a line between the pin 14 and pivot-point, 16, of the plate will pass at that side of the pivot-point 17 of the lever toward the handle 18 thereof, and therefore the tension on the lever will be upward toward the stop. When the lever is thrown downward to the position shown in Fig. 3 the tension on the plate 12 is relieved and said plate may be easily released from the pin 14, and the sections opened.

The device is especially adapted for that class of meat or hams which are cooked and compressed in cylindrical cooking vessels, and is adjustable to rolls of different sizes. Both ends of the receptacle are preferably open, so that after the roll of meat is clamped therein it may be pushed out at either end for the purpose of cutting off slices, and in this operation the end of the receptacle will form a guide for the knife so that the slices will be cut evenly.

An important feature of this invention is the fact that the hinges which join the longitudinal sections to the central section are continuous. This prevents the meat from being caught or clamped between the edges of the longitudinal sections and the central section, so that when the sections are locked together the meat may be readily moved toward the end of the device at which the slices are being cut. Upon the release of the clamping device the longitudinal sections which are made preferably of sheet metal will spring away from the meat, thereby enabling the latter to be readily removed or adjusted into a better cutting position.

Having described my invention, I claim:

1. A device for holding meat, comprising a receptacle composed of opposite longitudinal sections hinged to fold upon the meat, the ears of one of the hinges projecting from the outer side of the receptacle, and means for connecting the opposite hinged sections, said means engaging the projecting hinge-ears to lock the hinged sections together.

2. A device for holding meat, comprising a receptacle composed of longitudinal sections hinged together to fold upon the meat so that the outer ends of the sections will overlap each other, the ears of one of the hinges projecting from the outerside of the receptacle to form a stop, a plate pivoted to one of the overlapping sections and provided with a series of holes, and a cam-lever pivoted to the receptacle at one side of the aforesaid-hinge-ears and having a pin with which the pivoted plate engages.

3. A device for holding meat, comprising a trough-like central portion, a longitudinal section on each side of said central portion, a continuous hinge extending the entire length of the longitudinal sections for joining each of said longitudinal sections to said central portion, said sections being arranged to fold upon the meat so that the outer ends of the sections will overlap each other, and means for locking the overlapping sections.

4. A device for holding meat, comprising a central trough-like section having bent over portions at its edges constituting hinge members, a longitudinal section on each side of said central section having bent over portions constituting hinge members and arranged to alternate with the hinge members of said central portion, pintles for connecting the hinge members of said central portions and said longitudinal side sections, said longitudinal side sections being arranged to fold upon the meat so that the outer ends of the sections will overlap each other, and means for locking the overlapping sections.

5. A device for holding meat, comprising a trough-shaped section of spring sheet metal, longitudinal side sections of spring sheet metal, continuous hinges joining the side sections to the edges of the central section, the longitudinal sections being arranged to fold upon the meat so that the outer ends of the sections will overlap each other, means for clamping the overlapping sections and for causing the bending of the sections into arcs of smaller radius, the release of the bent sections causing them to spring away from the meat.

6. In a device for holding meat, a plurality of sections arranged to fold upon the meat, fastening members carried by said section, said fastening members being connected together, and means for moving said fastening members while connected in one direction to clamp and lock the sections upon the meat and to move the clamping members in the opposite direction to expand and hold the sections away from the meat.

7. In a device for holding meat, a central portion, a foldable section on each side of said central portion, said side sections being arranged to fold upon the meat, a pivoted fastening member carried by each one of said sections, said pivoted fastening members being pivotally connected together, a handle secured to one of said fastening members for moving the members while connected, the movement of said pivoted members in one direction serving to clamp and lock the foldable sections on the meat, the reverse movement of the handle expanding the foldable sections away from the meat and holding the device in the expanded condition.

8. In a device for holding meat, a central portion, a foldable section on each side of said central portion, said side sections being arranged to fold upon the meat, a pivoted fastening member carried by each one of said sections, said pivoted fastening members being pivotally connected together, a handle carried by one of said pivoted fastening members, a movement of said fastening members while connected in one direction serving to clamp and lock the foldable members upon the meat, and the movement in the opposite direction expanding and holding the foldable sections away from the meat, the pivotal connection of said pivotal members being adjustable to vary the extent of movement of the foldable sections.

FREDERICK BRIGGS.

In presence of—
H. P. HOWARD, Jr.,
W. S. DUVALL.